April 21, 1964  J. G. GRIER  3,130,016
PROCESS FOR BRINE MANUFACTURE
Filed May 9, 1961
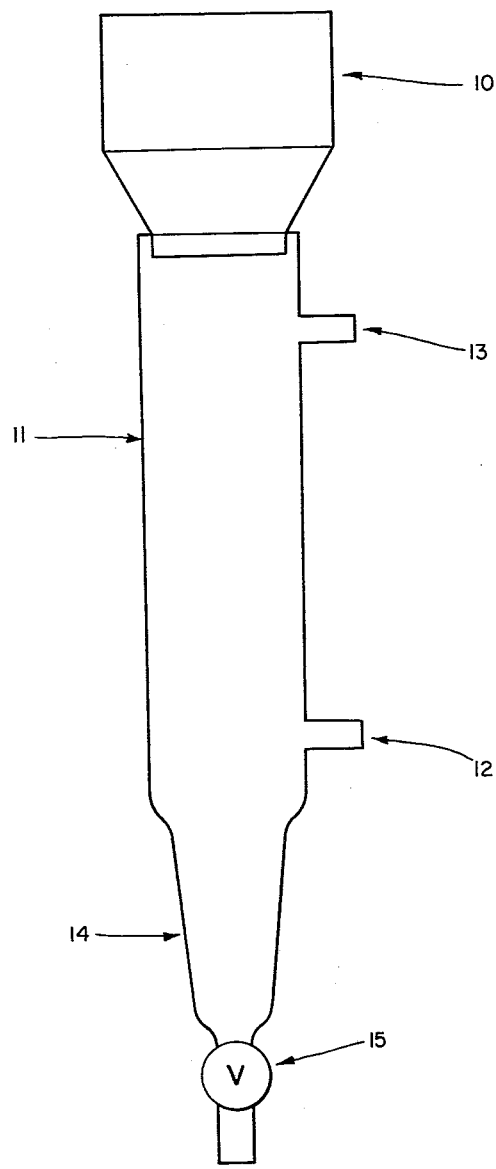
INVENTOR.
JESSE GYGER GRIER
BY *Paul Lipsitz*
AGENT United States Patent Office 3,130,016
Patented Apr. 21, 1964

3,130,016
PROCESS FOR BRINE MANUFACTURE
Jesse G. Grier, Gilbertsville, Ky., assignor to Pennsalt Chemicals Corporation, Philadelphia, Pa., a corporation of Pennsylvania
Filed May 9, 1961, Ser. No. 108,901
5 Claims. (Cl. 23—312)

This invention relates to an improvement in the process of preparing brine solutions and is particularly concerned with increasing the concentration of brine solutions depleted by their use in electrolysis cells where the brine is converted to chlorine and sodium.

In the manufacture of chlorine and caustic by the electrolysis of sodium chloride brine in mercury cells it is normal to utilize only about 15% of the salt content of the brine on each pass through the cells. The brine is normally recycled after its strength is regained by contact with rock salt. Rock salt, however, naturally contains small amounts of calcium sulfate (e.g., 0.75% to 5.0% $CaSO_4$ depending upon its source) and this impurity is randomly distributed as granules which, in the case of Louisiana rock salt, for example, are mostly in the size range of 5 to 15 mils diameter. When the rock salt is contacted with the depleted brine to increase the NaCl concentration, the calcium sulfate impurity (also known as anhydrite) dissolves. Unfortunately, such impurity is deleterious to cell operation and thus the $CaSO_4$ must be removed from the brine. The removal of the $CaSO_4$ or its reduction to a tolerable level (e.g. 0 to about 25 milligrams per liter of $Ca^{++}$) is done chemically by precipitation of $SO_4^=$ with soluble barium salts (e.g., $BaCO_3$ and $BaCl_2$) and $Ca^{++}$ is removed with soda ash. Both insoluble products must be mechanically separated by settling, filtration, etc. Such chemical treatment and filtration requires large amounts of expensive chemicals and obviously contributes to inefficiency of the process.

The methods of the prior art to prepare brine solutions are quite varied. In one technique liquid brine is passed through a bed of crushed salt and while such method gives a brine of high clarity the calcium sulfate content is not reduced. In U.S. Patent 2,412,560 a method is disclosed for the production of pure brine solutions whereby rock salt is dissolved in fresh water by using the counter-flow principle in that the solute moves downwardly and the solvent moves upwardly at a decreasing pace. To accomplish the decreasing flow rate of the solvent a conical dissolver is used which is filled with salt before introduction of the water solvent. As pointed out in the patent, this results in decreasing the possible time length within which dissolution of the undesired soluble impurities (e.g., $CaSO_4$) can occur through contact with the solvent, and although the product is a commercially pure brine, such a brine still contains too high an amount of $CaSO_4$ for use as brine in mercury electrolysis cells. The process of U.S. 2,412,560 also is deficient in that it cannot maintain a suitable volume of effluent and the output becomes negligible in a short time. The equipment is also bulky and difficult to clean.

Other devices for brine manufacture are also known as for example the pulsator dissolver disclosed in U.S. 2,281,140 and the improved model described in U.S. 2,734,804. But these devices, too, are not entirely suitable for replenishment of depleted brine solutions used in electrolysis, being particularly disadvantageous because of their complexity and their need for frequent cleanout.

While it is known that the rate of solution of sodium chloride is higher than the rate of solution of calcium sulfate, the processes now in the art have not utilized this principle to develop a satisfactory method for increasing the concentration of depleted brine while maintaining the calcium ion at a level below about 100 to 150 milligrams per liter (mg. p.l.). Now, however, by means of this invention a novel, efficient, low cost and simple process is provided for replenishing depleted brine while maintaining a significantly low level of calcium ion. This is accomplished in accord with this invention by the process which comprises dropping salt particles containing $CaSO_4$ as an impurity into the top of a vertical column through which is flowing a brine solution at a pH above about 3.5, said brine being introduced at a concentration below saturation and flowing through said column above a trap for undissolved $CaSO_4$, the flow rate of said brine solution being between about 0.1 and about 3 feet per minute, and said salt particles being of a size to enable the largest particles to be essentially completely dissolved as they reach the bottom of said column at a point above said $CaSO_4$ trap, whereby the insoluble $CaSO_4$ impurity collects in said trap, and a concentrated brine solution of high purity is obtained as the output from said column.

In order to better understand the invention, reference is now made to the drawing which illustrates the equipment for the process. A hopper 10 equipped with a suitable feed or distributing device (e.g., a vibrator or a rotary feeder) is used to store and feed the salt into the vertical column 11 which may be cylindrical, rectangular or of other generally uniform cross section. The depleted brine solution is preferably introduced at input line 12 and exits at 13 thus flowing upwardly. The reverse alternate procedure, however, whereby brine enters at line 13 and flows downwardly to exit through line 12 is also operable. The area 14 below line 12 is the calcium sulfate trap and this may be fitted with transparent sight glasses to observe the build-up which is removed by opening valve 15.

In the preferred operating procedure which occurs at temperatures between about 140° F. and 175° F. the salt falls through the upwardly flowing brine and builds up the salt concentration to an acceptably saturated condition (e.g., about 290 to about 320 grams per liter) by dissolving in the liquid. Essentially all of the salt is dissolved by the time it reaches the lower regions of the column. The $CaSO_4$ impurity, however, dissolves at a lower rate than the salt and very little of the $CaSO_4$ dissolves in the time required for it to reach the bottom of the column where it continues to fall into the trap. The brine removed from the column generally contains only about 20 to about 30 milligrams per liter of $Ca^{++}$. Furthermore, because essentially all of the salt is dissolved there is little, if any, salt loss, thus contributing further to the efficiency of the process.

As the depleted brine normally used in this process exits from the electrolysis cells its temperature is between about 140° and 175° F. The brine from the cells is usually first subjected to a vacuum degassing and to an air blowing operation to remove chlorine trapped in it. During these operations the temperature may decrease slightly, but the temperature of the brine will generally be within the above temperature range. Unless this temperature range is maintained with such brine, crystallization of salt may occur, causing not only serious loss of salt, but also interference with successful operation of the process. However, it is to be understood that brine at lower temperatures can be fortified by the process of this invention.

As indicated, the depleted brine entering the column is less than saturated and will usually contain between about 250 and 275 g.p.l. (grams per liter) of NaCl. Also significant to this invention, however, is that the brine solution have a pH greater than about 3.5, a pH of from about 5.0 to 13 being preferred. At pH values below about 3.5 the effluent brine contains an excessive concentration of $CaSO_4$ and only by maintaining the pH within the above limits is the calcium ion in the brine held to a low level. The pH of the depleted brine as it is obtained from the electrolysis cells is about pH 2 and thus it is treated with an alkaline material such as an alkali metal hydroxide or carbonate to bring it to the desired pH. In a preferred technique, caustic is simply added with agitation to the depleted brine until the desired pH is reached.

In the preferred case where the brine flows upwardly, the rate of rise of brine will be slow relative to the initial rate of falling salt. It will be understood that as the salt particles flow through the column the rate of fall will change, due to its reduction of size by solution and the increasing buoyant effect of the upwardly flowing brine. It has been found that the brine velocity most useful is between about 0.007 to about 0.03 foot per second (i.e., from about 0.4 to about 1.8 ft./min.), but brine flow rates in feet per minute may vary from about 0.1 to about 3 feet per minute. When the rate of brine flow exceeds about 3 ft./min. excessive carryover of $CaSO_4$ particles into the effluent occurs. Conversely, a brine rate below about 0.1 ft./min. will require uneconomically large equipment for commercial practice.

The rock salt used to feed into the column will be of a size range so that little or no salt falls through the column without solution. The effect of too large a particle size is evident when cleaning out the $CaSO_4$ trap, for any undissolved salt particles will gather here and will be readily observed. On the other hand, the salt size should not be so small that it causes problems in handling and feeding. Generally the salt size will be between about 14 and 60 U.S. standard sieve size and with this size and proper operating conditions little or no salt will appear in the trap. If salt does accumulate in the trap either the salt feed rate is abnormally high or the salt concentration of the depleted brine has risen abnormally. In either case, the brine concentration within the column has risen to such an extent that the dissolving rate is too slow for the column to dissolve the descending salt. To correct this condition, the salt feed rate is reduced whereby the amount of undissolved salt is quickly reduced to a negligible level while the output brine is relatively unaffected. When the condition of overconcentration of dissolved salt in the column is corrected, the normal salt feed rate is again resumed. Requirements for labor and attention to salt feed control are slight since the salt feed can be controlled automatically by an outlet brine concentration analyzer. When the inlet brine concentration is essentially constant (as it will be when taken from the electrolysis cells), and if some extra dissolving capacity is included in the normal operating procedure, no condition of excessive salt loss will arise.

The column in which the process occurs will be preferably of any generally uniform cross-section and will have a cross-sectional area sufficiently large that the linear flow of brine is relatively low compared to the rate of fall of salt. In actual practice, of course, the cross-sectional area of the column will depend upon the desired capacity. For the usual commercial applications the capacity of the process will be such that a salt input rate will be used which varies from about 1 to about 10 pounds of salt per minute for each square foot of column cross-section. In commercial practice this will require a cylindrical column diameter of from about 2 to 15 feet. Thus, if a brine flow of 1200 gallons per minute (i.e., 160 cu. ft. per minute) and the linear brine velocity is 1.2 ft. per minute, the required cross-sectional area of the column must be 133 sq. ft. With a cylindrical column this will mean a diameter of 13 feet. Assuming further that the depleted brine will have its concentration increased by 45 grams per liter, the required salt feed rate will be 450 lbs./minute. While a column of essentially uniform cross-section is preferred because of simplicity, the process may be employed with other column shapes, as for example an inverted cone. With an inverted cone type container, however, it will be most desirable to use upwardly flowing brine, for downward flow may cause excessive carryover into the effluent. Conversely, with a regular cone, downwardly flowing brine will be more desirable for the same reasons. The essential feature with any shape container is to maintain the brine flow within the above discussed range.

It will be understood that the height of the column is related to the size of the salt used, for the column must provide the shortest time for solution of $CaSO_4$ and yet, to avoid loss of salt, must permit essentially all of the NaCl to dissolve. For the size of salt referred to above (i.e., 14 to 60 U.S. sieve) a column of about 10 to about 50 feet in height is found to be applicable for the effective use of the process.

As indicated above, the process of this invention may also be operated by passing the brine downwardly and concurrently with the falling salt. In such a case the downward linear velocity of the brine is also low with respect to the fall of salt. One suitable arrangement is to have the brine descend an internal cylinder with the dissolving salt and ascend a concentrically located external cylinder. Alternately, the downwardly flowing brine may exit to a vertical standpipe to maintain the height of the column.

In order to more fully illustrate the invention the additional specific examples are given:

EXAMPLE 1

The dissolver (also referred to as the column) was a 40 ft. high, glass-fiber insulated steel cylinder, 26 inches in diameter, open at the top and closed by a conical trap at the bottom. At the bottom of and open to the conical trap was a 36-inch section of 6-inch diameter glass pipe for observing the accumulation of $CaSO_4$ and any undissolved salt. Each end of the glass pipe was fitted with a ball valve so that the accumulated solids could be flushed out periodically.

Inlet brine was pumped, via a 2-inch diameter pipe, into the column immediately above the trap and was distributed upwardly into the column by a perforated 1½" pipe extending across the column. Brine flow was measured by a rotameter and controlled at various values between 9.2 and 56 g.p.m. (gallons per minute) which corresponds to linear flow rates of 0.4 to 2.0 feet per minute. The brine flowed out of the column through one of any of five 2-inch pipes located at 20, 25, 30, 35 and 40 feet from the bottom inlet.

Salt used was commercial Louisiana grades as follows: granulated (mostly 12–25 U.S. sieve size), a fine (mostly 25–60 U.S. sieve size), and "C" grade (mostly 8–16 U.S. sieve size). Up to 1200 lbs. at a time were emptied into a hopper located at the top of column. The salt was fed from the hopper in a continuous, measured flow into the center of the brine surface in the column with the aid of a vibrating feeder. Salt rate was measured principally by timing and weighing a portion of the salt flow. A 6-inch diameter polyvinyl chloride pipe was used to conduct the salt into and below the brine surface in cases where brine currents would have caused salt to be carried out the brine outlet. The input brine had a pH of 10 and was passed through the column at a temperature of 150° to 160° F. Calcium ion content of input brine was nil.

The following table indicates additional specific conditions used and the results obtained:

Table I

A. EFFECT OF COLUMN HEIGHT
[Granulated salt (12 to 25 U.S. sieve size)]

| Column height (ft.) | Brine velocity (ft./min.) | Brine flow (g.p.m.)[1] | Calcium in brine outlet (mg.p.l.) | Percent salt undissolved | Inlet brine conc. (g.p.l.)[2] | Outlet brine conc. (g.p.l.) |
|---|---|---|---|---|---|---|
| 40 | 0.33 | 9.2 | 16.5 | 0.85 | 261 | 304 |
| 35 | 0.41 | 11.2 | 23 | 1.9 | 268 | 304 |
| 30 | 0.41 | 11.2 | 18 | 9.0 | 275.5 | 305 |
| 25 | 0.41 | 11.2 | 12.8 | 8.1 | 270.5 | 305 |
| 20 | 0.41 | 11.2 | 16 | 12.7 | 270 | 302 |

[1] Gallons per minute.
[2] Grams per liter.

It will be seen from the above table that the calcium ion concentration in the brine effluent at any column height is quite low, being from about 13 to 23 milligrams per liter. The amount of undissolved salt ranges from essentially none (0.85%) to a moderate amount (12.7%), but even this higher value is not necessarily considered uneconomical. However, the salt loss is a function of both column height and particle size, and for lower column heights a finer salt particle size will result in lower undissolved salt values.

B. EFFECT OF BRINE FLOW
[Salt particle size (12 to 25 U.S. sieve size)]

| Column height (ft.) | Brine velocity (ft./min.) | Brine flow (g.p.m.) | Calcium in brine outlet (mg.pl.)[1] | Percent salt undissolved | Inlet brine conc. (g.p.l.)[2] | Outlet brine conc. (g.p.l.) |
|---|---|---|---|---|---|---|
| 35 | 2.04 | 56.0 | 20 | 0.2 | 267.5 | 305 |
| 35 | 1.04 | 28.7 | 26 | 0 | 258 | 298 |
| 35 | 0.85 | 23.4 | 32.5 | 1.0 | 266 | 306 |
| 35 | 0.66 | 18.1 | 21.5 | 0.85 | 273.5 | 307 |
| 35 | 0.41 | 11.2 | 23 | 1.9 | 268 | 304 |
| 35 | 0.21 | 5.7 | 24 | 5.2 | 268.5 | 307 |

[1] Milligrams per liter.
[2] Grams per liter.

The above table indicates the general effect of brine flow in that there is a tendency toward lower salt loss with higher brine flow rates.

C. EFFECT OF SALT SIZE

| Column height (ft.) | U.S. sieve size[1] | Brine velocity (ft./min.) | Brine flow (g.p.m.) | Calcium in brine outlet (mg.p.l.) | Percent salt undissolved | Inlet brine conc. (g.p.l.) | Outlet brine conc. (g.p.l.) |
|---|---|---|---|---|---|---|---|
| 40 | 8–16 | 0.33 | 9.2 | 19 | 15.3 | 261 | 294 |
| 40 | 12–25 | 0.33 | 9.2 | 16.5 | 0.85 | 261 | 304 |
| 40 | 25–60 | 0.33 | 9.2 | 20 | 0 | 264.5 | 303 |

[1] 85% to 95% within stated size.

The above data clearly show the general effect of salt particle size in that the finer the salt added the less salt loss that results.

EXAMPLE 2

Following the general details of Example 1, a cylindrical vertical column 15 feet high and 2 inches in diameter was set up and fitted at the bottom below the brine inlet (or outlet) with a valve trap. Depleted brine was pumped at 160° F. into the bottom (or top) inlet of the column and the brine feed maintained continuous at a controlled rate with the aid of a rotameter. The temperature of the output brine was 140° F. Salt was fed into the top of the column continuously from a hopper using a vibrator for control. The feed brine contained 255 g.p.l. of NaCl.

The following table shows the conditions used and the results obtained:

Table II

| Brine velocity (ft./min.) | Direction of Brine flow | Brine pH | Salt size U.S. std. sieve | Rate of salt feed (g./min.) | Output brine conc. (g.p.l.) | mg.p.l. Ca++ in output brine |
|---|---|---|---|---|---|---|
| 0.12 | Up | 4 | 12–20 | 4.5 | 302 | 10 |
| 0.24 | Up | 4 | 12–20 | 5.8 | 300 | 15 |
| 0.47 | Up | 10 | 12–20 | 16.2 | 298 | 10 |
| 0.13 | Down | 10 | 12–20 | 5.3 | 301 | 10 |

EXAMPLE 3

Using the equipment and procedures set out in Example 1, a fine salt having a particle size of about 95% in the range of 25 to 60 U.S. sieve size was fed into the column to treat various depleted brines. The following table indicates the specific conditions used and the results obtained:

Table III

A. CONSTANT BRINE FLOW

| Column height (ft.) | Brine velocity (ft./min.) | Brine flow (g.p.m.) | Calcium in brine outlet (mg.pl.) | Percent salt undissolved | Inlet brine conc. (g.p.l.) | Outlet brine conc. (g.p.l.) |
|---|---|---|---|---|---|---|
| 20 | 0.41 | 11.2 | 21.6 | Nil | 268.3 | 304 |
| 25 | 0.41 | 11.2 | 16.8 | Nil | 270.3 | 306 |
| 30 | 0.41 | 11.2 | 17.8 | Nil | 266 | 298 |
| 35 | 0.41 | 11.2 | 23 | Nil | 268.3 | 303.2 |
| 40 | 0.41 | 11.2 | 21.7 | Nil | 268 | 306 |

The above data again illustrate the valuable results obtained by the process of this invention. The use of fine salt resulted in no salt loss at any column height and the effluent brine was low in calcium ion.

B. CONSTANT COLUMN HEIGHT—VARIABLE BRINE FLOW RATE

| Column height (ft.) | Brine velocity (ft./min.) | Brine flow (g.p.m.) | Calcium in brine outlet (mg.p.l.) | Percent salt undissolved | Inlet brine conc. (g.p.l.) | Outlet brine conc. (g.p.l.) |
|---|---|---|---|---|---|---|
| 35 | 0.41 | 11.2 | 23.0 | Nil | 268.2 | 303.2 |
| 35 | 0.81 | 22.4 | 20.0 | Nil | 268.3 | 304 |
| 35 | 1.22 | 33.6 | 37.6 | Nil | 257.3 | 303.2 |
| 35 | 1.63 | 44.8 | 22.1 | Nil | 259.2 | 299 |
| 35 | 2.04 | 56.0 | 28.5 | Nil | 259 | 299 |

The above data illustrate successful operation of a column 35 feet high using a wide variation of a brine velocity. Again salt loss was nil and the effluent brine contained low calcium ion values.

It is to be understood that the above description and examples are not intended to limit this invention and that numerous changes and variations may be made by the skilled art worker without departing from the spirit and scope of the invention.

I claim:

1. The process of increasing the concentration of a depleted NaCl brine solution which comprises introducing salt particles having a size range of about 14 to about 60 U.S. sieve size and containing calcium sulfate as an impurity into the top of a vertical unobstructed column through which is flowing a brine solution at a pH above about 3.5, said brine being introduced at a concentration below saturation and flowing through said column above a trap for undissolved $CaSO_4$, the linear flow rate of said brine solution being between about 0.1 and 3 feet per minute, said salt particles being allowed to fall freely through said brine solution until they are essentially completely dissolved at a point above said $CaSO_4$ trap whereby the insoluble $CaSO_4$ impurity collects in said trap and a concentrated brine solution low in calcium ion concentration is obtained as the output from said column.

2. The process of increasing the concentration of a brine solution which comprises introducing salt having a particle size predominantly in the range of 14 to 60 U.S. sieve size and containing $CaSO_4$ as an impurity, into the top of a vertical cylindrical unobstructed column through which said salt falls freely and through which is flowing a brine solution at a pH between about 3.5 and 13, said brine being introduced at a concentration below saturation and flowing upwardly through said column above a trap for undissolved $CaSO_4$, the linear flow rate of said brine solution being between about 0.1 and 3 feet per minute and said salt particles falling freely through said brine solution being essentially completely dissolved at a point above said $CaSO_4$ trap whereby the $CaSO_4$ impurity collects in said trap and a concentrated brine solution low in calcium ion concentration is obtained as the output from said column.

3. The process of increasing the concentration of a brine solution which comprises introducing salt having a particle size predominantly in the range of 14 to 60 U.S. sieve size and containing $CaSO_4$ as an impurity, into the top of a vertical cylindrical unobstructed column through which said salt falls freely and through which is flowing a brine solution at a pH between about 3.5 and 13, said brine being introduced at a concentration below saturation and flowing downwardly through said column above a trap for undissolved $CaSO_4$, the linear flow rate of said brine solution being between about 0.1 and 3 feet per minute and said salt particles falling freely through said brine solution until they are essentially completely dissolved at a point above said $CaSO_4$ trap whereby the $CaSO_4$ impurity collects in said trap and a concentrated brine solution low in calcium ion concentration is obtained as the output from said column.

4. The process of increasing the concentration of a brine solution which comprises introducing salt having a particle size predominantly in the range of 14 to 60 U.S. sieve size and containing $CaSO_4$ as an impurity, into the top of a vertical cylindrical unobstructed column through which said salt falls freely and through which is flowing a brine solution at a temperature between about 140° and 175° F. and at a pH between about 5 and 13, said brine solution being introduced at a concentration below saturation and flowing upwardly through said column above a trap for undissolved $CaSO_4$, the linear flow rate of said brine solution being between about 0.4 and 1.8 feet per minute and said salt particles falling freely through said brine solution until they are essentially completely dissolved at a point above said $CaSO_4$ trap whereby the $CaSO_4$ impurity collects in said trap and a concentrated brine solution low in calcium ion concentration is obtained as the output from said column.

5. The process of increasing the concentration of a sodium chloride brine depleted in sodium chloride content by its conversion to chlorine and sodium in a mercury electrolysis cell which comprises feeding said depleted brine, at a pH between about 5 and 13 into a vertical cylindrical unobstructed column and causing said brine to flow in an upwardly direction, dropping salt having a particle size predominantly in the range of 14 to 60 U.S. sieve size into the top of said column and through which said salt falls freely, the linear flow rate of said brine solution being between about 0.4 and 1.8 feet per minute, providing a trap below the point of introduction of said brine into said column for undissolved $CaSO_4$ which is an impurity in said salt, and allowing said salt particles to fall freely through said brine solution until they are essentially completely dissolved at a point above said $CaSO_4$ trap, removing a concentrated brine solution low in calcium ion concentration from an upper portion of said column.

References Cited in the file of this patent

UNITED STATES PATENTS

| | | |
|---|---|---|
| 2,412,560 | Bolton | Dec. 17, 1946 |
| 2,734,804 | Courthope et al. | Feb. 14, 1956 |
| 2,850,438 | Bodkin et al. | Sept. 2, 1958 |
| 2,876,182 | Hopper et al. | Mar. 3, 1959 |
| 3,038,783 | Arita et al. | June 12, 1962 |